(12) United States Patent
Nageshkar et al.

(10) Patent No.: US 12,528,397 B2
(45) Date of Patent: Jan. 20, 2026

(54) VEHICLE HAVING DEPLOYABLE PILLAR MOUNTED TABLE

(71) Applicant: Ford Global Technologies, LLC, Dearborn, MI (US)

(72) Inventors: Vishal Vinayak Nageshkar, Windsor (CA); Sangram Tamhankar, Farmington Hills, MI (US); Kevin Wayne Preuss, Ortonville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 18/137,097

(22) Filed: Apr. 20, 2023

(65) Prior Publication Data

US 2024/0351498 A1    Oct. 24, 2024

(51) Int. Cl.
*B60N 3/00* (2006.01)
*B60N 2/01* (2006.01)

(52) U.S. Cl.
CPC ............... *B60N 3/001* (2013.01); *B60N 2/01* (2013.01)

(58) Field of Classification Search
CPC .......... B60N 3/001; B60N 3/002; B60R 7/04; B60R 2011/0022; B64D 11/0638; B62D 25/04; B60P 3/36; A47B 5/006; A47B 5/04; A47B 31/06
USPC ...... 296/1.07, 24.39, 37.13, 193.06; 108/44; 224/482, 543, 544
See application file for complete search history.

(56) References Cited

U.S. PATENT DOCUMENTS

| | | | | |
|---|---|---|---|---|
| 1,809,866 | A * | 6/1931 | Riesche | A47B 5/04 108/134 |
| 4,068,601 | A * | 1/1978 | Marsh | A47B 5/04 403/100 |
| 7,963,231 | B2 | 6/2011 | Osborne et al. | |
| 9,358,929 | B1 * | 6/2016 | Huebner | B60R 11/02 |
| 9,849,818 | B2 | 12/2017 | Barnes | |
| 9,849,819 | B2 | 12/2017 | Farooq et al. | |
| 10,427,577 | B2 * | 10/2019 | Sequi | B60N 3/002 |
| 10,919,426 | B1 * | 2/2021 | Campagnone | B60R 7/04 |
| 2009/0293774 | A1 * | 12/2009 | Cheung | A47B 5/06 74/89.23 |
| 2015/0142245 | A1 * | 5/2015 | Cuddihy | B60N 2/06 297/344.21 |

(Continued)

FOREIGN PATENT DOCUMENTS

| CN | 109645666 A * | 4/2019 | ............... A47B 3/00 |
|---|---|---|---|
| CN | 117549808 A * | 2/2024 | |

(Continued)

OTHER PUBLICATIONS

Yoon (KR 20190056705 A), machine translation (Year: 2019).*

(Continued)

*Primary Examiner* — Amy R Weisberg
*Assistant Examiner* — Wenwei Zhuo
(74) *Attorney, Agent, or Firm* — Vichit Chea; Price Heneveld LLP

(57) ABSTRACT

A vehicle including a cabin interior, a pillar support structure at least partially exposed to the cabin interior, and a deployable table operatively coupled to the pillar support structure. The deployable table is movable between a stowed position pivoted against the pillar support structure and a deployed position pivoted vehicle inward within the cabin interior.

10 Claims, 13 Drawing Sheets

(56) References Cited

U.S. PATENT DOCUMENTS

2017/0181536 A1* 6/2017 De Saulles ............ A47B 31/06

FOREIGN PATENT DOCUMENTS

| DE | 102017130609 | A1 |   | 6/2018 |
|----|--------------|----|---|--------|
| DE | 102019123956 | A1 | * | 3/2021 |
| KR | 200194819    | Y1 | * | 9/2000 |
| KR | 20190056705  | A  | * | 5/2019 |

OTHER PUBLICATIONS

Nonnenbroich et al. (DE 102019123956 A1), machine translation (Year: 2021).*
Huang et al. (CN 109645666 A), machine translation (Year: 2019).*

* cited by examiner

VEHICLE HAVING DEPLOYABLE PILLAR MOUNTED TABLE

FIELD OF THE DISCLOSURE

The present disclosure generally relates to vehicle workstations, and more particularly relates to a vehicle having a deployable table that deploys within the cabin interior.

BACKGROUND OF THE DISCLOSURE

Motor vehicles are commonly equipped with a cabin interior having passenger seating for transporting passengers. In some situations where passengers may want a worksurface, it would be desirable to provide for a table that may be deployed within the cabin interior.

SUMMARY OF THE DISCLOSURE

According to a first aspect of the present disclosure, a vehicle is provided including a cabin interior, a pillar support structure at least partially exposed to the cabin interior, and a deployable table operatively coupled to the pillar support structure, wherein the deployable table is movable between a stowed position pivoted against the pillar support structure and a deployed position pivoted vehicle inward within the cabin interior.

Embodiments of the first aspect of the present disclosure can include any one or a combination of the following features:
 the deployable table comprises a pivoting support assembly coupled to the pillar support structure to support the deployable table in the deployed position and allow the deployable table to move to the stowed position;
 the pivoting support assembly comprises a hinge coupling the deployable table to the pillar support structure;
 the deployable table comprises a first panel and a second panel;
 the first panel slides relative to the second panel;
 further comprising a third panel, wherein the second and third panels move relative to the first panel between extended positions and retracted position;
 the support structure further comprises a pivot rod operatively coupled to the pillar support structure, wherein the pivot rod rotates the deployable table between extended and folded configurations;
 the pillar support structure further comprises a trim panel on a cabin interior side;
 the vehicle trim panel further comprises a pocket, wherein the deployable table may be stowed within the pocket in the stowed position and may extend outside of the pocket in the deployed position;
 a first seat configured proximate to the deployed position of the deployable table; and
 a second seat configured to face towards the deployed position of the deployable table.

According to a second aspect of the present disclosure, a vehicle is provided including a cabin interior, a pillar support structure at least partially exposed to the cabin interior, a hinge coupled to the pillar support structure, and a deployable table coupled to the hinge, wherein the deployable table is movable between a stowed position pivoted against the pillar support structure and a deployed position pivoted vehicle inward within the cabin interior.

Embodiments of the second aspect of the present disclosure can include any one or a combination of the following features:
 the deployable table comprises a first panel and a second panel;
 the first panel slides relative to the second panel;
 further comprising a third panel, wherein the second and third panels move relative to the first panel between extended positions and retracted position;
 the support structure further comprises a pivot rod operatively coupled to the pillar support structure, wherein the pivot rod rotates the deployable table between extended and folded configurations;
 the pillar support structure further comprises a trim panel on a cabin interior side;
 the vehicle trim panel further comprises a pocket, wherein the deployable table may be stowed within the pocket in the stowed position and may extend outside of the pocket in the deployed position;
 a first seat configured proximate to the deployed position of the deployable table; and
 a second seat configured to face towards the deployed position of the deployable table.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
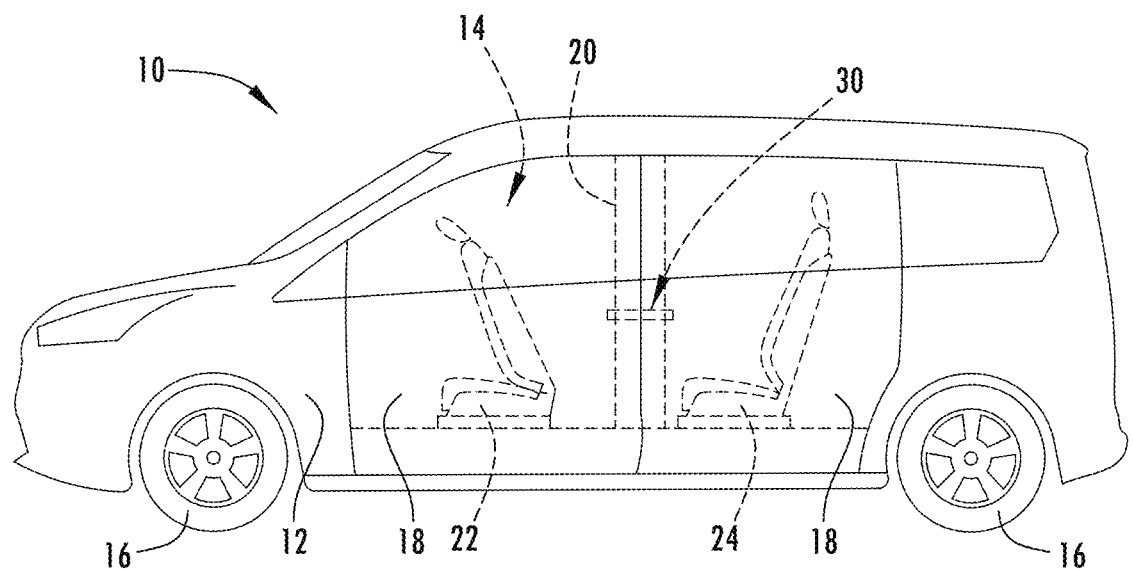
FIG. 1 is a side view of a motor vehicle having a deployable table in a cabin interior proximate to a first seating configuration.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a deployable table. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1A:
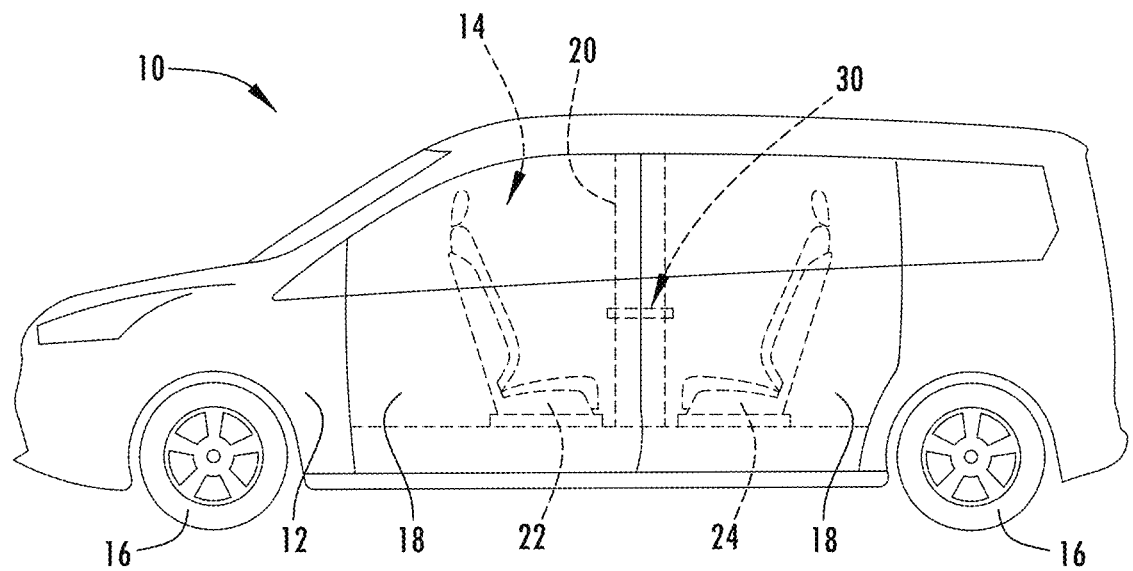
FIG. 1A is a side view of the motor vehicle having the deployable table in the cabin interior proximate to a second seating configuration.

Referring to FIGS. 1 and 1A, a wheeled automotive or motor vehicle 10 is generally illustrated configured with passenger seating and accommodations for transporting one or more passengers. The motor vehicle 10 has a vehicle body 12 that generally defines a cabin interior 14. The cabin interior 14 may contain various features and trim components within the vehicle body 12. The cabin interior 14 is shown having an arrangement of passenger seats including a front row of seating having one or more front seats 22 and a second rear row of seating including one or more rear seats 24. The vehicle 10 may include additional seating which is common for a typical large SUV, van or bus. It should be appreciated that the vehicle 10 may be a motor vehicle, such as a wheeled car, truck, SUV, van or bus, for example, or an airplane, train, boat or other vehicle capable of transporting one or more passengers.

The cabin interior 14 in the example shown in FIG. 1 has one or more front row seats 22 generally shown facing vehicle forward and one or more second row of seats 24 also shown generally facing vehicle forward in a first configured shown in FIG. 1. In the configuration in the example shown in FIG. 1A, one or more of the one or more front seats 22 may be reconfigured such as rotated about 180 degrees about a vertical axis to face vehicle rearward. In the rearward facing position, passengers seated in the one or more first row of seats 22 may face passengers seated in the vehicle second row of seats 24. In the seating configuration shown in FIG. 1, the one or more seats 24 in the second row may be presented with a deployable table 30 that deploys proximate to one or more seats to provide a work surface that may be used to hold items, such as work articles, for example. In the seating configuration shown in FIG. 1A, either or both of passengers seated in seats 22 and 24 in the respective first and second rows of seating may be presented proximate thereto with the deployable table in a deployed position as discussed herein according to various embodiments.

The motor vehicle 10 includes a pillar support structure 20 shown generally extending vertically between a lower vehicle support such as the vehicle floor and an upper vehicle support such as the vehicle roof generally on the cabin interior side of the body 12. It should be appreciated that one or more pillar support structures including, for example, A-pillars, B-pillars, C-pillars and D-pillars may be located on each of the opposite lateral sides of the vehicle 10. The pillar support structure 20 may provide a rigid support beam usually made of metal, such as steel, and may include one or more trim panels covering the underlying structural support, e.g., steel, of the pillar support structure on the cabin interior side.

The deployable table 30 is operatively coupled to the pillar support structure 20 and is movable between a stowed position on the pillar support structure 20 and one or more deployed use positions providing a work surface extending within the cabin interior 14 and away from the pillar support structure 20. One or more of the pillar support structures may include a deployable table 30. As such, a plurality of deployable tables may be located on different pillar support structures such as the front A-Pillar, the center B-Pillar as seen in FIGS. 1 and 1A and the rear C-Pillar, for example.

The deployable table 30 is operatively coupled to the pillar support structure 20 and is movable between a stowed position pivoted proximate to and against the pillar support structure 20 and one or more use positions pivoted vehicle cabin inward from the pillar support structure 20 within the cabin interior 14 to present a work surface. Referring to FIGS. 2A-2D, the deployable table 30 is shown according to a first embodiment. In this embodiment, the deployable table 30 has a first upper panel 32 slidably engaged with a second lower panel 34. The first panel 32 has a first work surface on the top side and the bottom side has a longitudinal U-shaped slot or first track 38 at one end and an I-shaped connector 40 at or near the opposite end. The second lower panel 34 has a tongue 36 configured to matingly engage the first track 38 and the I-shaped connector 40 connecting the lower second panel 34 to the second track 41 such that the first upper panel 32 may slide laterally relative to the lower second panel 34 in the vehicle longitudinal direction between the first deployed position shown in FIG. 2B and the second deployed position shown in FIG. 2C which provides an expanded size work surface.

The deployable table 30 has a hinge 44 supporting the first upper and second lower panels 32 and 34 at the end coupled to the pillar support structure 20. The hinge 44 connects the deployable table 30 to the pillar support structure 20 at a pivot location. The hinge 44 allows the deployable table 30 to pivot and rotate 90 degrees between the stowed vertical position shown in FIG. 2A and the deployed horizontal position shown in FIG. 2D. It should be appreciated that one or more hinges may be employed to connect the deployable table 30 to the pillar support structure 20.

To further support the deployable table 30 in the deployed horizontal position, a support assembly is connected to the second lower panel 34 at connector 56 and the pillar support structure 20 at connector 54. The support assembly has first and second support arms 48 and 50 connected at pivot connector 52. In the deployed position, the support assembly locks the support arms 48 and 50 in a straight configuration to support the deployable table 30 in the deployed horizontal position. To retract the deployable table 30 to the stowed position, a force may be applied upward on one or both of support arms 48 and 50 near pivot connector 52 to cause the support assembly to fold and allow the table 30 to pivot downward to the substantially vertical stowed position.

Figure 3A:
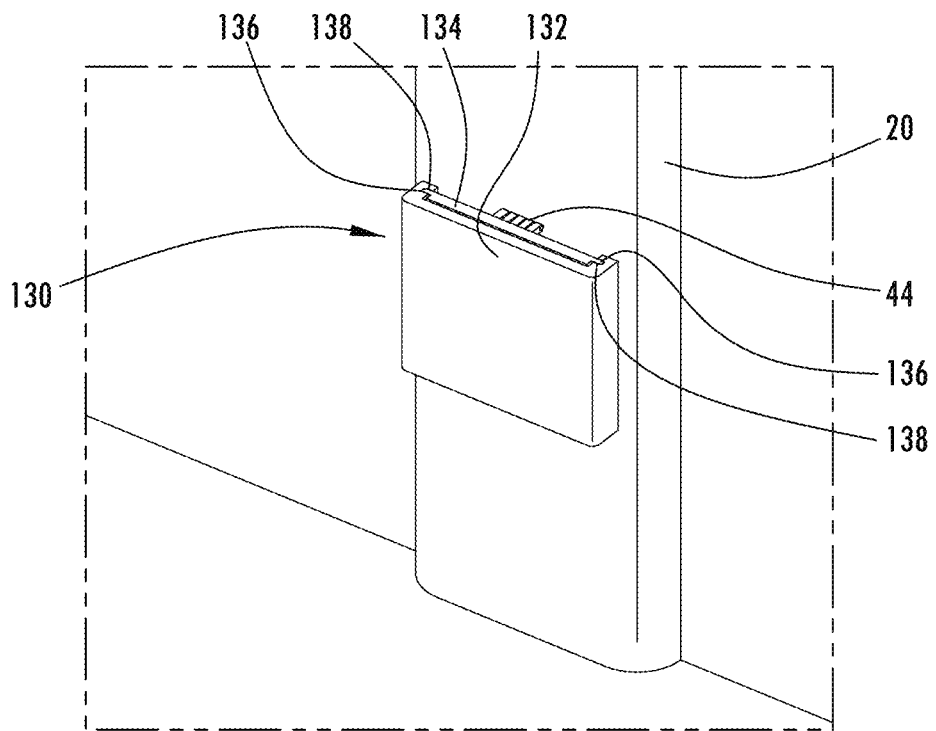
FIG. 3A is a perspective view of a deployable table shown operatively coupled to a pillar support structure within the cabin interior in a stowed position, according to a second embodiment.
Figure 3B:
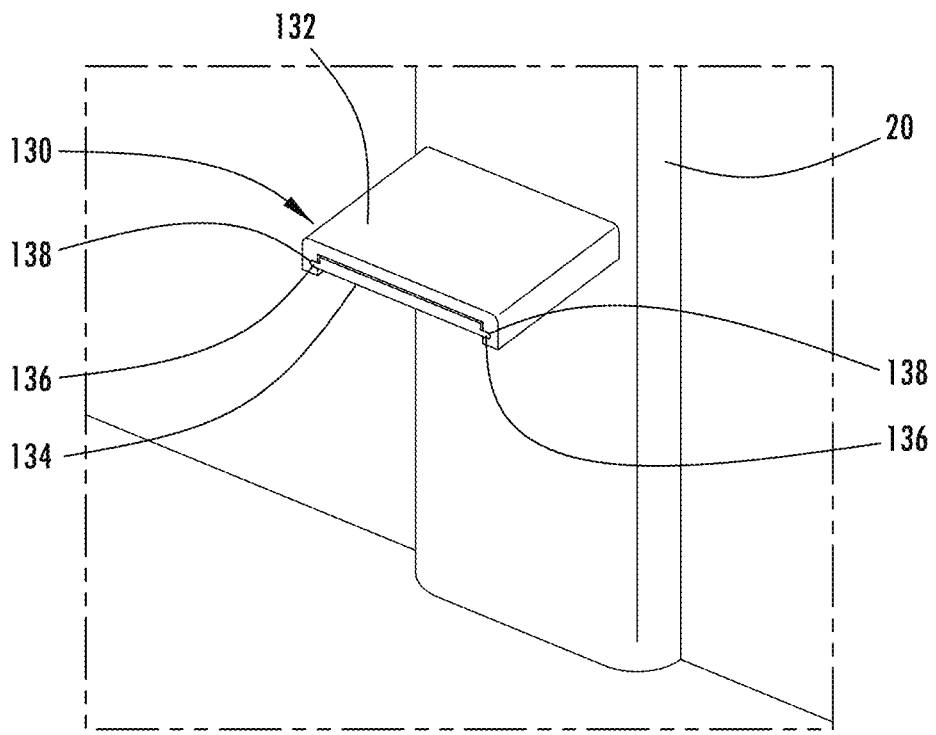
FIG. 3B is a perspective view of the deployable table of FIG. 3A shown operatively coupled to the pillar support structure within the cabin interior in a first deployed position.
Figure 3C:
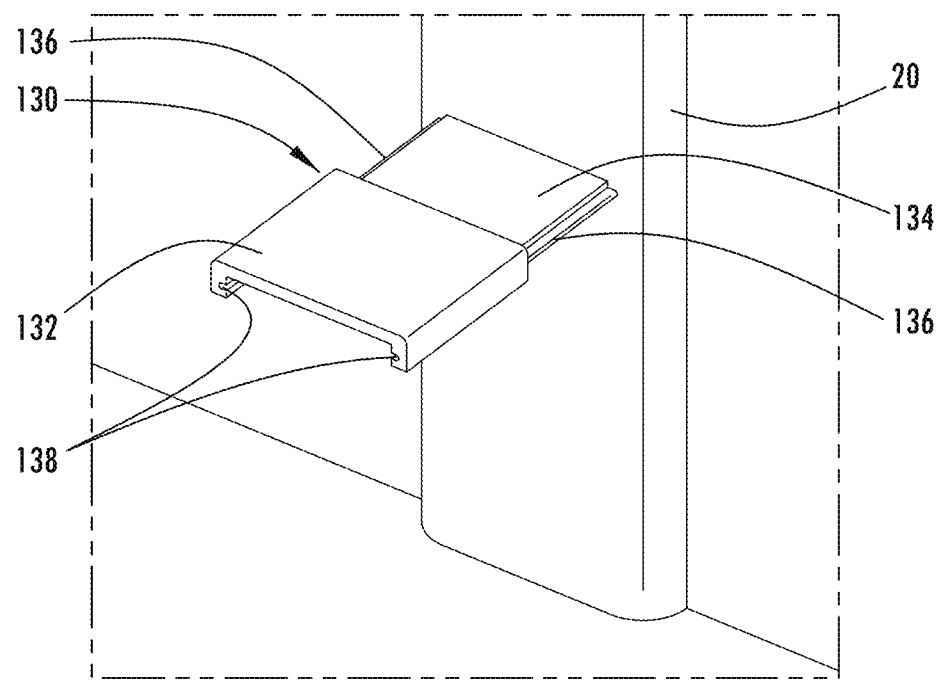
FIG. 3C is a perspective view of the deployable table of FIG. 3A shown operatively coupled to the pillar support structure within the cabin interior in a second deployed position.

Referring to FIGS. 3A-3C, a deployable table 130 is shown coupled to a pillar support structure 20 according to a second embodiment. In this embodiment, the deployable table 130 includes a first upper panel 132 slideably coupled to a second lower panel 134 and slideable between a first retracted deployed position shown in FIG. 3B and an elongated deployed position shown extending longitudinally outward away from the pillar support structure and further into the cabin interior in FIG. 3C. The first upper panel 132 has first and second slots or tracks 138 formed on opposite lateral sides in the underside and the second lower panel 134 has a pair of tongues 136 on opposite lateral sides engaged in the tracks 138. As such, the first upper panel 132 may extend relative to the second lower panel 134 away from and towards the pillar support structure 20 to extend or contract the size of the work surface.

Figure 2A:
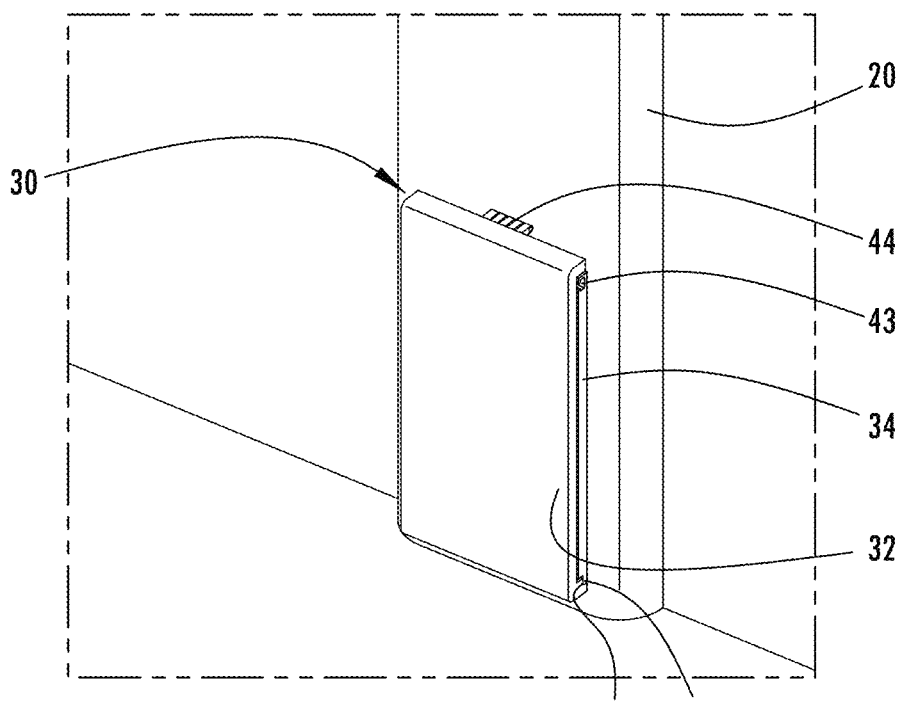
FIG. 2A is a perspective view of the deployable table shown operatively coupled to a pillar support structure within the cabin interior in a stowed position, according to a first embodiment.
Figure 2B:
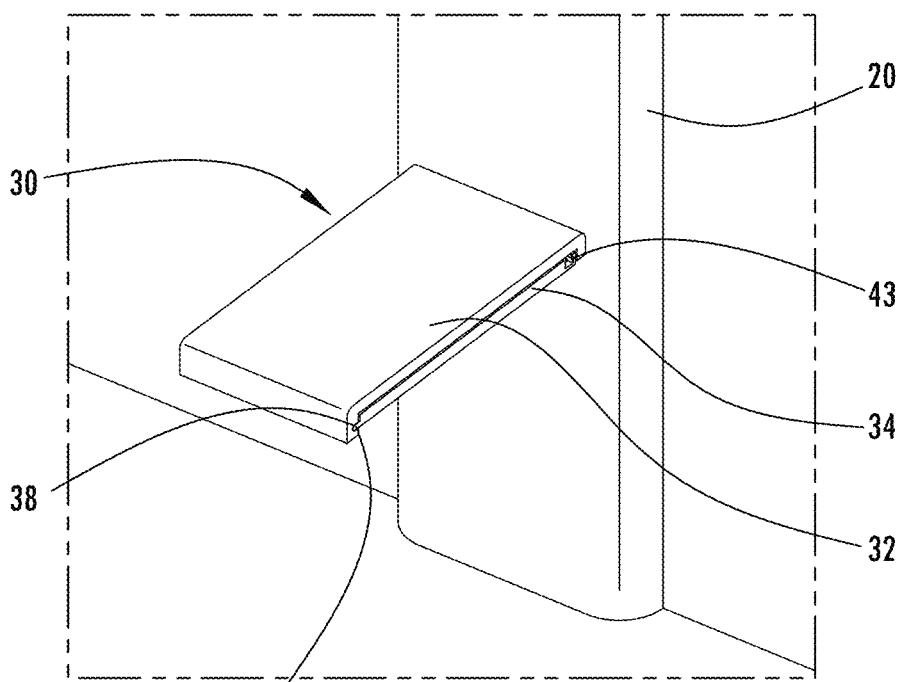
FIG. 2B is a perspective view of the deployable table of FIG. 2A shown operatively coupled to the pillar support structure within the cabin interior in a first deployed position.
Figure 2C:
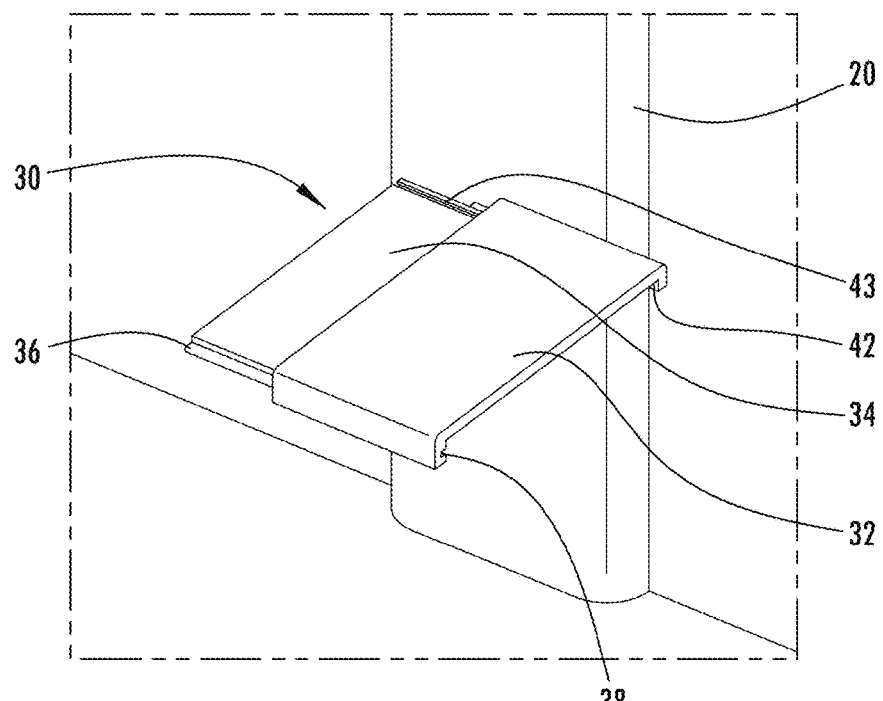
FIG. 2C is a perspective view of the deployable table of FIG. 2A shown operatively coupled to the pillar support structure within the cabin interior in a second deployed position.
Figure 2D:
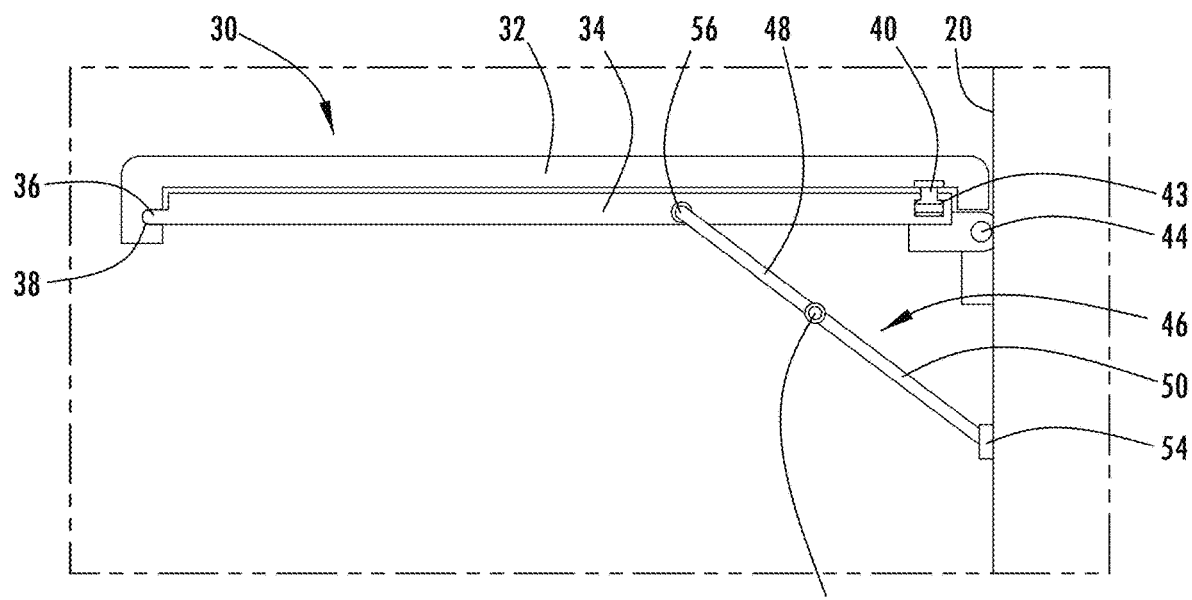
FIG. 2D is a side view of the deployable table shown of FIG. 2A shown in the second deployed position.

The deployable table 130 has a hinge 144 and support assembly coupled to the pillar support structure 20 similar to the hinge 44 and support assembly shown and described in connection with the deployable table 30 shown in FIG. 2D. As such, the deployable table 130 may pivot between the stowed vertical position shown in FIG. 3A and the horizontal deployed positions shown in FIGS. 3B and 3C.

Figure 4A:
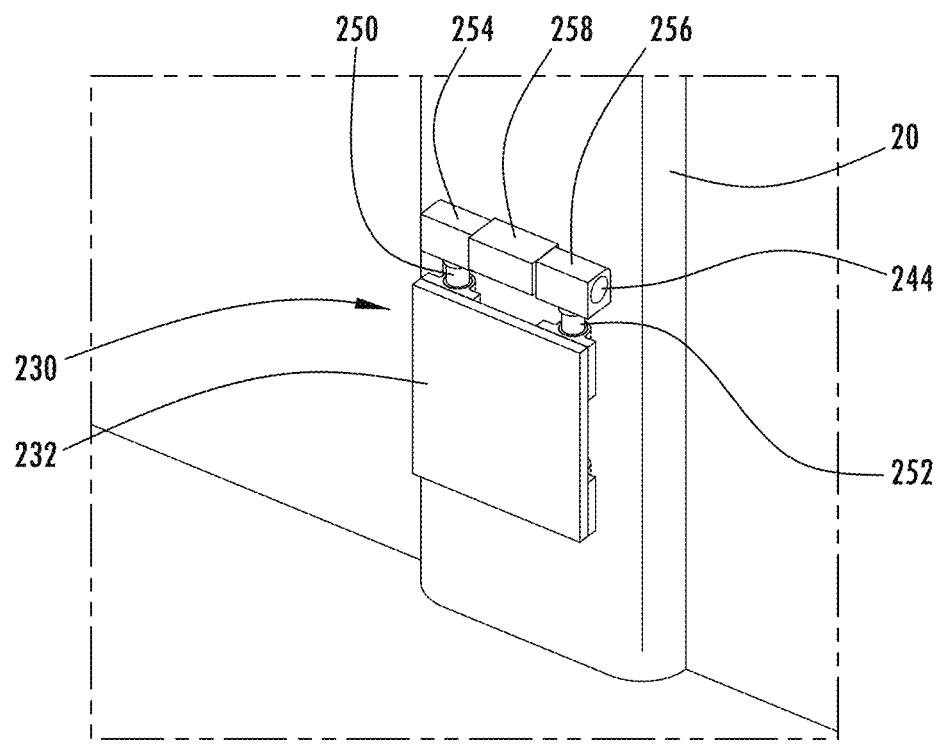
FIG. 4A is a perspective view of a deployable table shown operatively coupled to a pillar support structure within the cabin interior in a stowed position, according to a third embodiment.
Figure 4B:
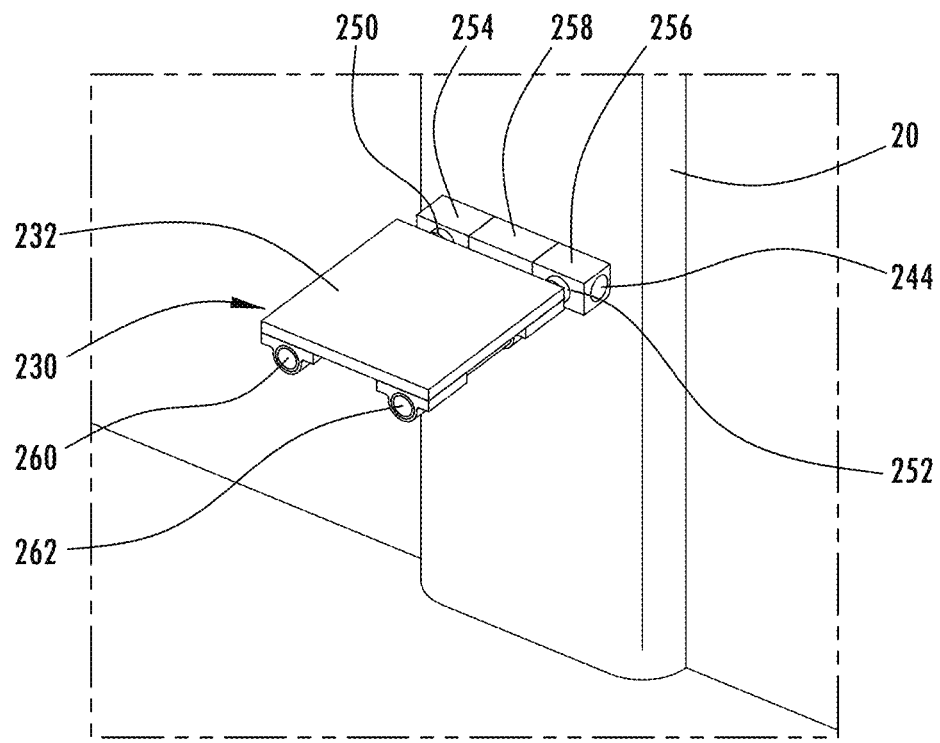
FIG. 4B is a perspective view of the deployable table of FIG. 4A shown operatively coupled to the pillar support structure within the cabin interior a first deployed position.
Figure 4C:
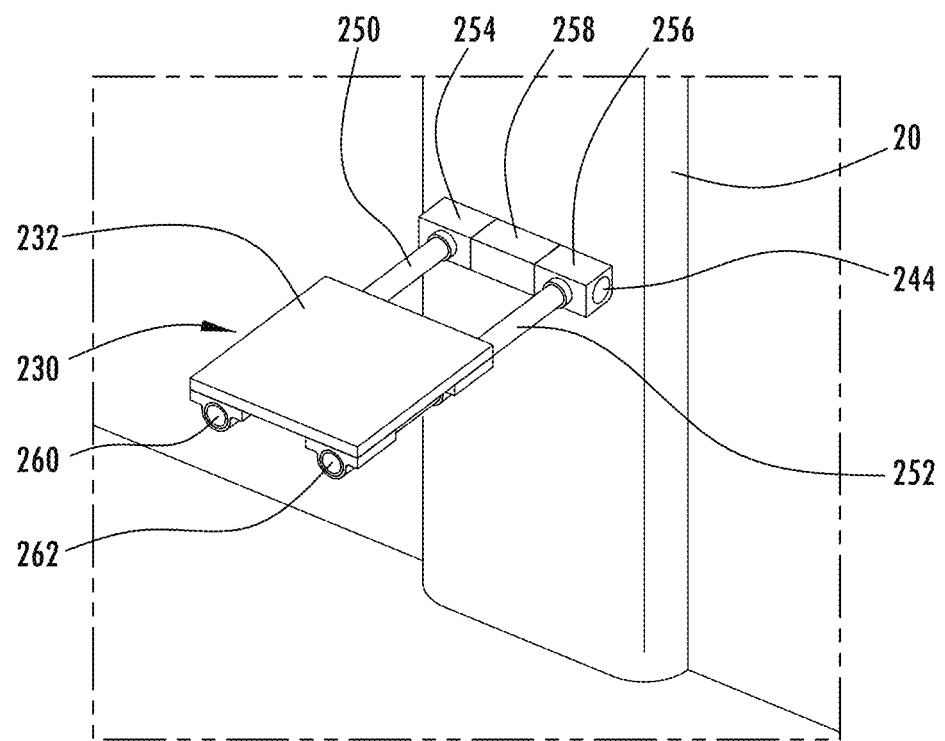
FIG. 4C is a perspective view of the deployable table of FIG. 4A shown operatively coupled to the pillar support structure within the cabin in a second deployed position.

Referring to FIGS. 4A-4C, a deployable table 230 is shown operatively coupled to the pillar support structure 20 according to a third embodiment. In this embodiment, the deployable table 230 includes a single panel 232 that provides a work surface on the top side thereof in the deployed positions. The panel 232 has a pair of parallel cylindrical guides 260 and 262 on the bottom side that matingly engage a pair of parallel support rods 250 and 252, respectively, that allow the panel 232 slide thereon to extend to an extended deployed position shown in FIG. 4C and a retracted deployed position shown in FIG. 4B. As such the deployed position of the deployable table 230 may be adjusted in length to accommodate the needs of a user.

The deployable table 230 has a hinge 244 that pivotably connects the table 230 to the pillar support structure 20. The hinge 244 has a pair of pivoting blocks 254 and 256 that support the support arms 250 and 252 and panel 232 in the deployed positions and rotate 90 degrees downward to rotate the panel 232 to the vertical stowed position. The support blocks 254 and 256 may be part of hinge 244 and may be frictionally engaged with a center block 258 located therebetween. As such, the frictional engagement provides a resistive force as a structural support to maintain the position of the deployable table 230 in the horizontal deployed positions and the vertical stowed position. It should be appreciated that other structural supports may be provided.

Figure 5A:
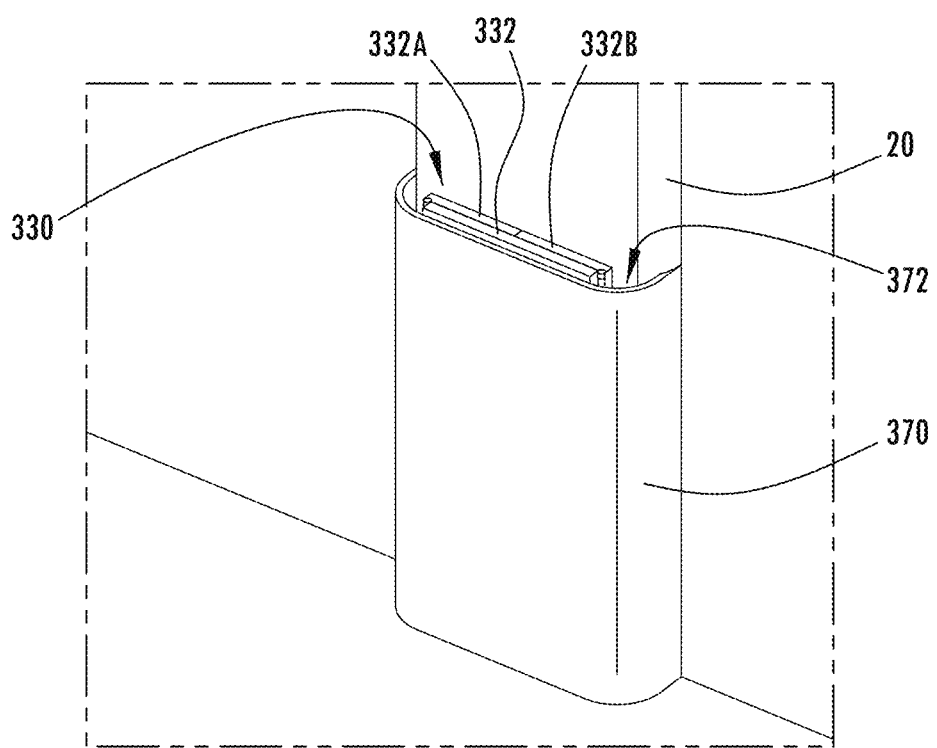
FIG. 5A is a perspective view of a deployable table stowed within a pocket coupled to a pillar support structure within the cabin interior, according to a fourth embodiment.

Referring to FIGS. 5A-5F, a deployable table 330 is illustrated operatively coupled to the pillar support structure 20 according to a fourth embodiment. In this embodiment, the deployable table 330 is slideably and pivotably coupled to the pillar support structure 20 and is stowable in a pocket 370 generally surrounding a portion of the pillar support structure 20. The deployable table 330 is shown in FIG. 5A fully stowed in a stowed position within the pocket 370 that extends around a portion of the pillar support structure 20 on the cabin interior side. The pocket 370 may be formed by a trim panel that extends away from the underlying pillar e.g., steel, to create a stowage space therebetween. In the fully stowed position, the deployable table 330 is oriented extending vertically downward against the pillar support structure 20 and within the pocket 370.

Figure 5B:
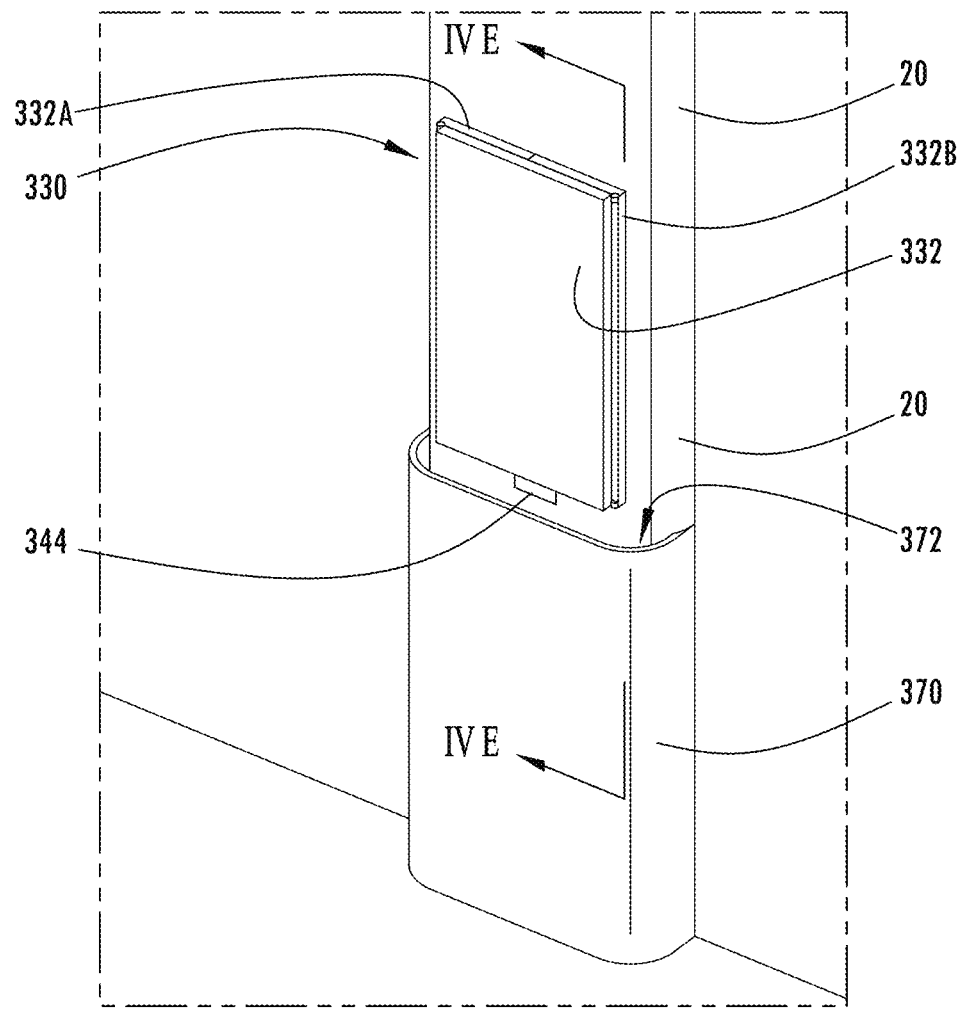
FIG. 5B is a perspective view of the deployable table of FIG. 5A operatively coupled to the pillar support structure and shown retracted from the pocket in a partially deployed position.
Figure 5C:
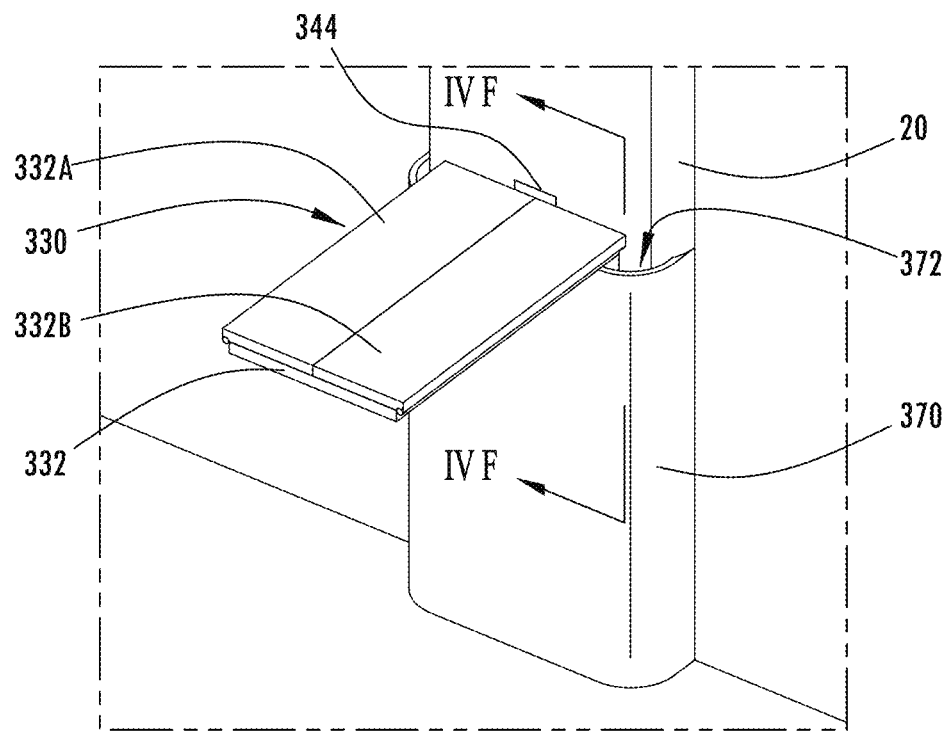
FIG. 5C is a perspective view of the deployable table of FIG. 5A shown operatively coupled to the pillar support structure in a first deployed position.
Figure 5D:
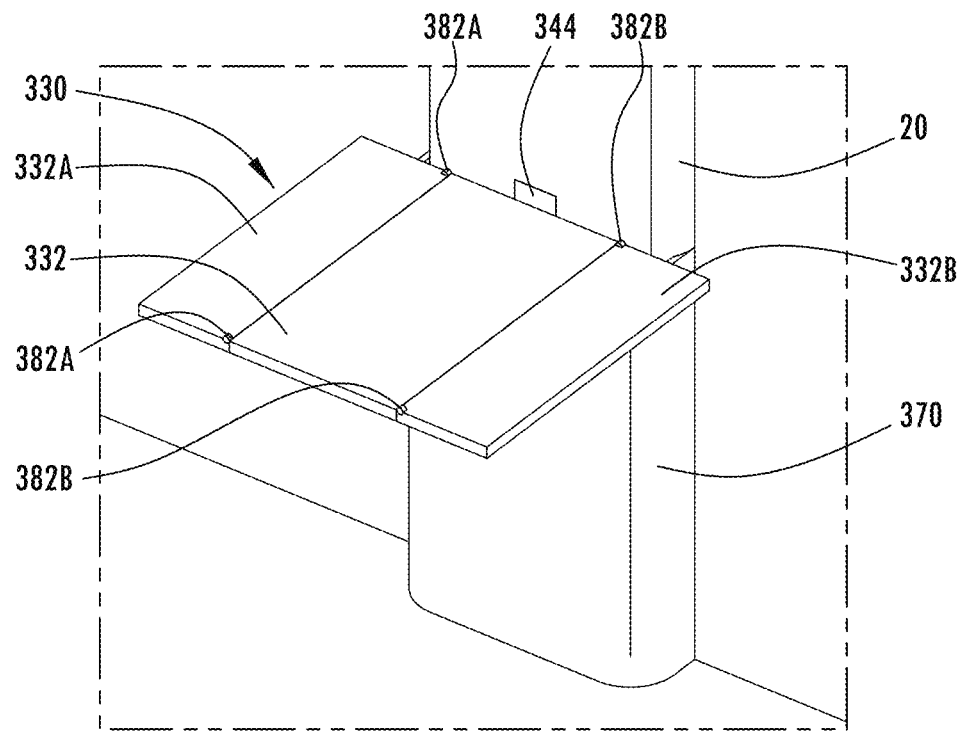
FIG. 5D is a perspective view of the deployable table of FIG. 5A shown operatively coupled to the pillar support structure in a second deployed position.
Figure 5E:
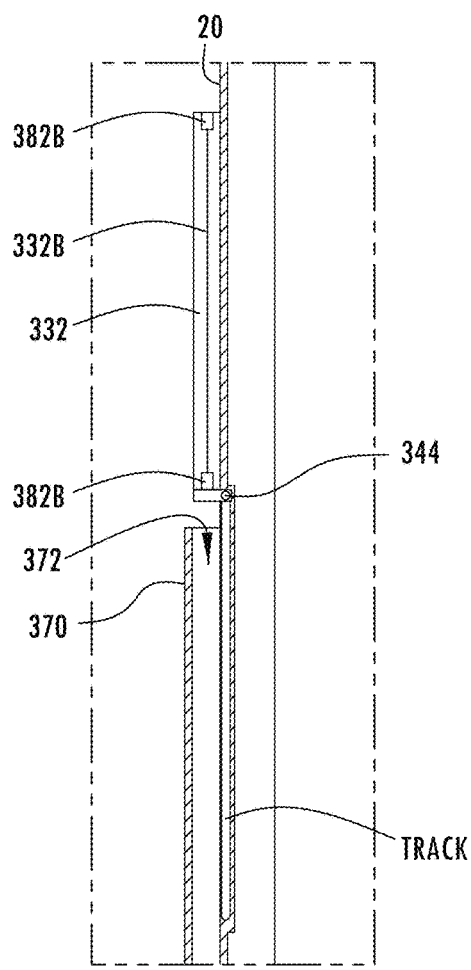
FIG. 5E is a cross-sectional view taken through line VE-VE of FIG. 5B further illustrating the deployable table operatively coupled to the pillar support structure.
Figure 5F:
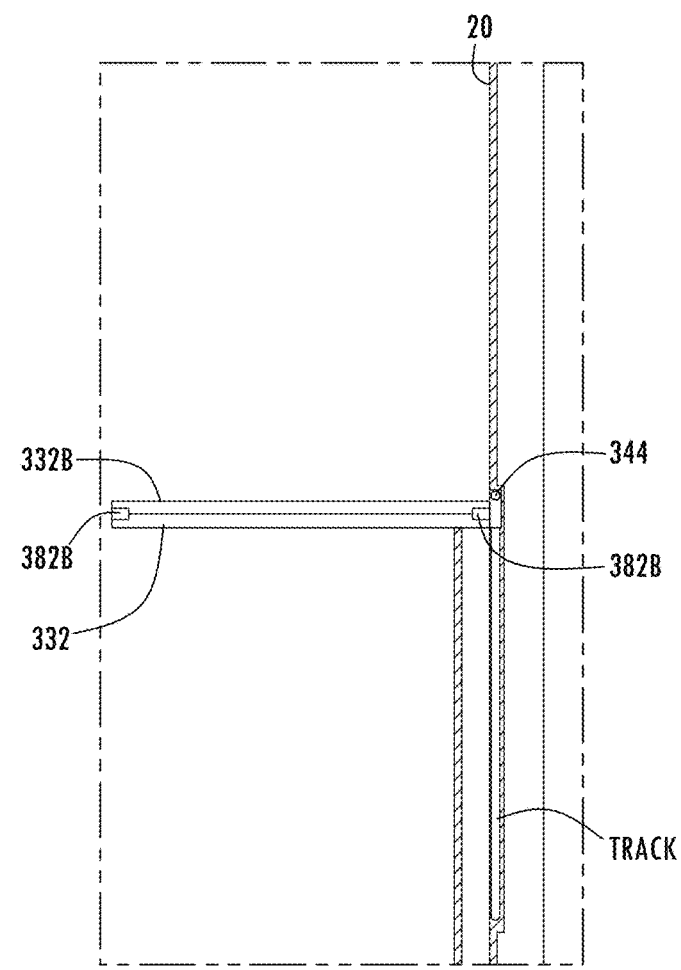
FIG. 5F is a cross-sectional view taken through line VF-VF of FIG. 5C further illustrating the deployable table operatively coupled to the pillar support structure.

To deploy the deployable table 330 to a deployed position, the deployable table 330 is raised by a force sliding upwards from the stowed position to a partially deployed position shown in FIGS. 5B and 5E. The pillar support structure 20 has a track 390 formed in the outer wall of the pillar support structure 20 generally extending vertically within the pocket 370. The deployable table 330 has a hinge 344 that slides within the track 390 between a bottom end limit and a top end limit. In the partially deployed position, the hinge 344 is able to pivot 90 degrees such that the deployable table 330 rotates downward to a first horizontal deployed position shown in FIGS. 5C and 5F.

The deployable table 330 has a first central panel 332 pivotally connected to second and third side panels 332A and 332B on opposite lateral sides. The second and third side panels 332A and 332B may be folded about hinges 382A and 382B, respectively, on top of the first central panel 332 to provide a small work surface as shown in FIG. 5C. To increase the work surface size, the second and third side panels 332 A and 332B may be rotated outwards about hinges 382A and 382B, respectively, to unfold into a large size work surface provided by all three panels in a coplanar configuration. To restow the deployable table 330, the second and third side panels 332A and 332B may be folded on top of the first central panel 332 and all three panels may be folded upwards against the pillar support structure 20 and the deployable table 330 pivoted downward and slid further downward into the pocket 370.

Figure 6A:
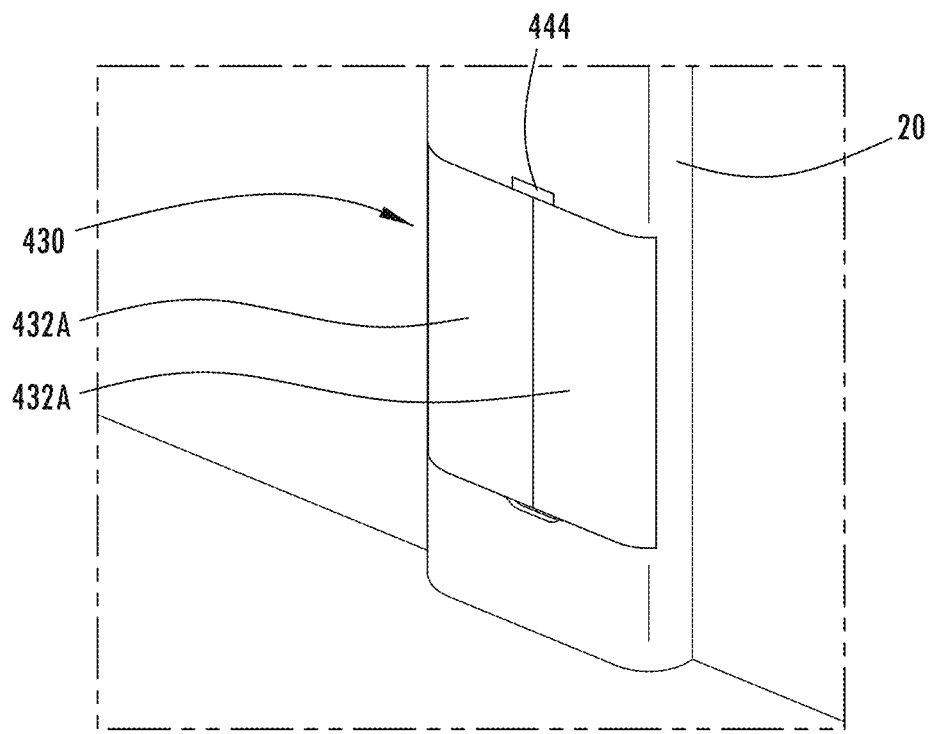
FIG. 6A is a perspective view of a deployable table operatively coupled to the pillar support structure shown in a stowed position, according to a fifth embodiment.

Referring to FIGS. 6A-6D, a deployable table 430 is illustrated operatively coupled to the pillar support structure 20 according to a fifth embodiment. In this embodiment, the deployable table 430 is stowable in a recess 480 formed in the pillar support structure 20. The recess 480 is shown as an approximately rectangular shaped recessed area formed in the pillar support structure 20 such as in the trim panel and/or the underlying support structure. The deployable table 430 has a hinge 444 connecting the deployable table 430 to the pillar support structure 20 which allows the deployable table 430 to pivot between the stowed vertical position fit conformally within the recess 480 as shown in FIG. 6A and a deployed horizontal position such as the deployable positions shown in FIGS. 6B-6D. The hinge 444 may include a frictional engagement or other support assembly to support the deployable table 430 in the deployed positions and to retain the table in the stowed position.

Figure 6B:
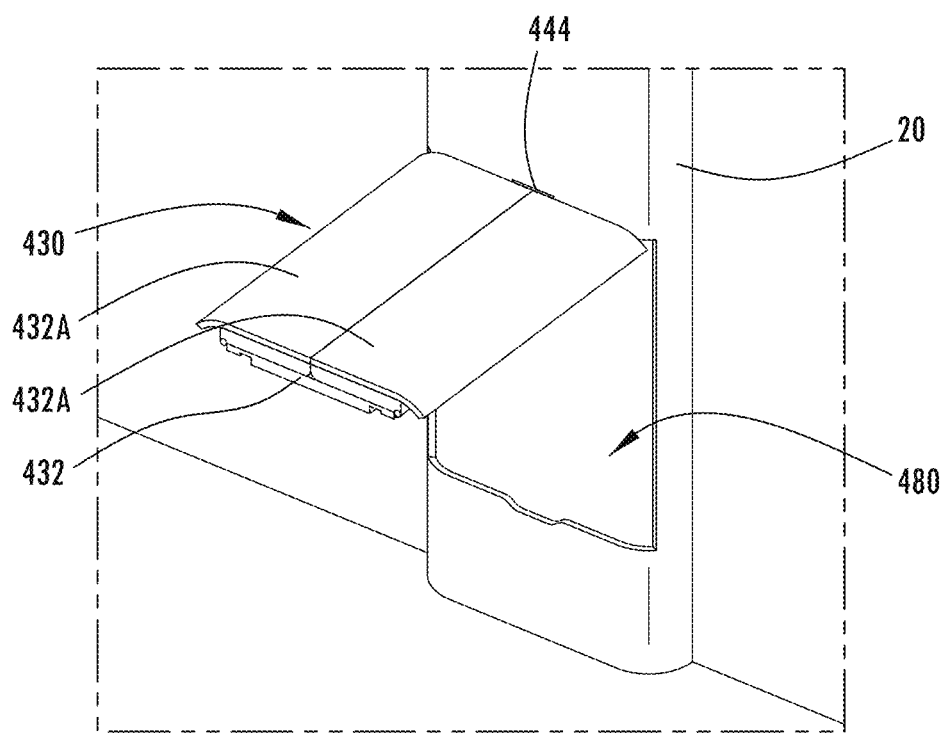
FIG. 6B is a perspective view of the deployable table shown in FIG. 6A in a first deployed position.
Figure 6C:
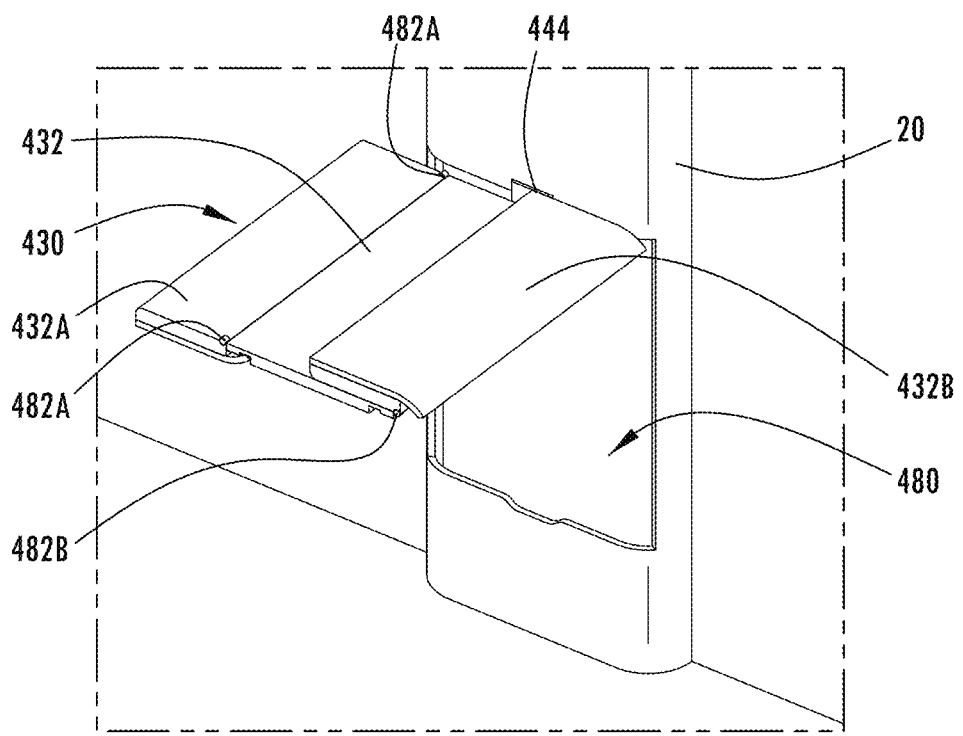
FIG. 6C is a perspective view of the deployable table shown in FIG. 6A in a second deployed position.
Figure 6D:
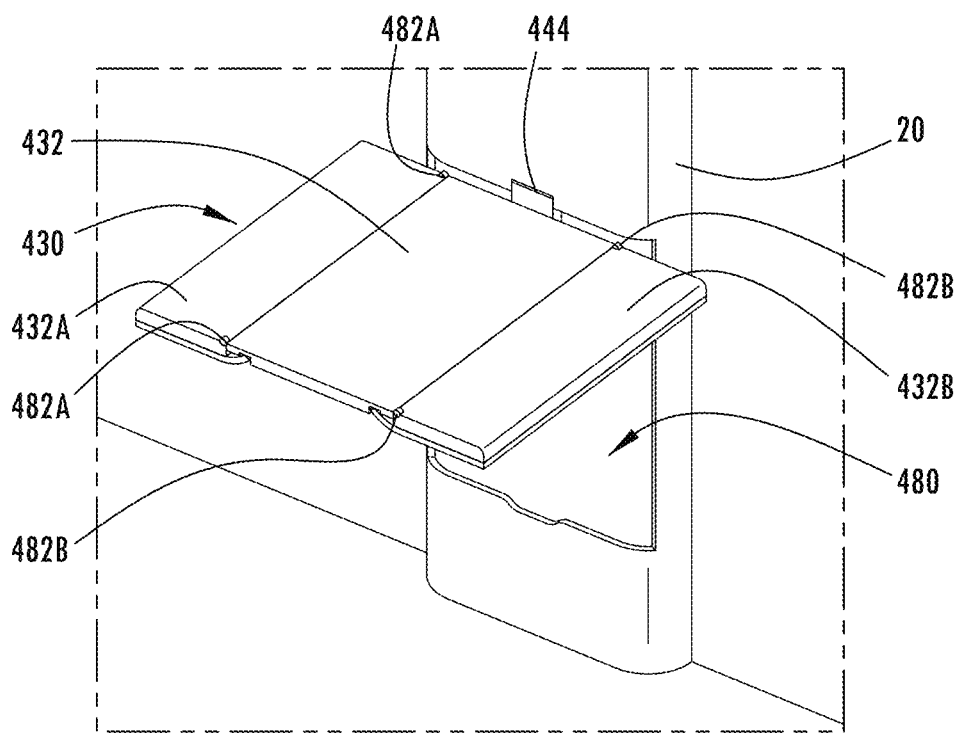
FIG. 6D is a perspective view of the deployable table shown in FIG. 6A in a third deployed position.

The deployable table 430 has a first central panel 432 and smaller second and third side panels 432A and 432B that may pivot outward about pivots 482A and 482B about lateral sides from a position covering the first central panel 432 as shown in FIG. 6B to expanded work surface positions as shown in FIGS. 6C and 6D. As such, the deployable table 430 may offer different size work surfaces in various deployed positions. The deployable table 430 may be restowed back to the stowed position by folding the smaller second and third side panels 432A and 432B on top of the first central panel 432 and pivoting the hinge 444 downward until the deployable table 430 is fully seated in the recess 480.

The deployable table 30, 130, 230, 330, and 430 advantageously provides for a work surface in a vehicle 10 that extends from a pillar support structure 20 into the cabin interior 14 of the vehicle 10 and may be stowed within or proximate to the pillar support structure 20 when not in use.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
    a cabin interior;
    a pillar support structure at least partially exposed to the cabin interior, wherein the pillar support structure further comprises a trim panel on a cabin interior side; and
    a deployable table operatively coupled to the pillar support structure, wherein the deployable table is movable between a stowed position pivoted against the pillar support structure and a deployed position pivoted vehicle inward within the cabin interior, wherein the trim panel further comprises a track extending vertically on the pillar support structure and a pocket extending around a portion of the pillar support structure and away from the pillar support structure and having an open top end and a space between the pocket and the pillar support structure, and wherein the deployable table may move through the open top end and be stowed within the space in the pocket on the track in the stowed position and may extend outside of the pocket from the track in the deployed position.

2. The vehicle of claim 1 further comprising a first seat configured proximate to the deployed position of the deployable table.

3. The vehicle of claim 2 further comprising a second seat configured to face towards the deployed position of the deployable table.

4. A vehicle comprising:
a cabin interior;
a pillar support structure at least partially exposed to the cabin interior and having a trim panel on a cabin interior side;
a hinge coupled to the pillar support structure;
a deployable table coupled to the hinge, wherein the deployable table is movable between a stowed position pivoted against the pillar support structure and a deployed position pivoted vehicle inward within the cabin interior;
a track extending vertically on the pillar support structure; and
a pocket extending around a portion of the pillar support structure and away from the pillar support structure and having an open top end and a space between the pocket and the pillar support structure, wherein the deployable table may move on the track through the open top end and into the space in the pocket in the stowed position and may extend outside of the pocket in the deployed position.

5. The vehicle of claim 4, wherein the deployable table comprises a first panel and a second panel.

6. The vehicle of claim 5, wherein the first panel slides relative to the second panel.

7. The vehicle of claim 5 further comprising a third panel, wherein the second and third panels move relative to the first panel between extended positions and retracted position.

8. The vehicle of claim 4, wherein the support structure further comprises a pivot rod operatively coupled to the pillar support structure, wherein the pivot rod rotates the deployable table between extended and folded configurations.

9. The vehicle of claim 4 further comprising a first seat configured proximate to the deployed position of the deployable table.

10. The vehicle of claim 9 further comprising a second seat configured to face towards the deployed position of the deployable table.

* * * * *